Oct. 13, 1970   R. J. GALLAGHER   3,534,352
COOLANT SENSING APPARATUS
Filed June 23, 1967

INVENTOR
Ray J. Gallagher

By Norton Lesser
Attorney

United States Patent Office 3,534,352
Patented Oct. 13, 1970

3,534,352
COOLANT SENSING APPARATUS
Ray J. Gallagher, Bensenville, Ill., assignor to Stewart-Warner Corporation, Chicago, Ill., a corporation of Virginia
Filed June 23, 1967, Ser. No. 648,280
Int. Cl. G08b 21/00
U.S. Cl. 340—244                                    4 Claims

ABSTRACT OF THE DISCLOSURE

The following specification describes apparatus for determining the presence or absence of coolant by means of a probe material which is either electro-negative or only slightly positive with respect to the metal wall of the vessel in which the coolant is disposed. This type of probe can be used to control one type of a transistor circuit providing a flashing or intermittent signal in the absence of coolant to render that signal quiescent for signalling the presence of coolant or with a different type of transistor circuit providing a steady signal in the absence of coolant to render that signal quiescent in the presence of coolant. A composite probe comprising the aforementioned material together with a more electro-positive material is also used with the first mentioned transistor circuit for indicating three different coolant levels.

This invention relates in general to apparatus for sensing the presence or absence of liquid or coolant and more particularly to an improved coolant sensing probe for use with different types of transistor circuits or for indicating different coolant levels.

The origins of the present invention reside in the nature of water cooled marine engines. Since these engines depend for their coolant on the water in which they are partially immersed in preference to a self-contained cooling system, a failure in the cooling system can result in either an immediate loss of coolant or a failure to provide the same after starting the engine so that the engine can overheat within a relatively short time. It is therefore desirable to provide a signal indicating the absence of coolant as soon as possible.

One arrangement for providing a signal on the absence of coolant in a marine engine is illustrated in U.S. Pat. No. 3,257,643. That arrangement utilizes a carbon probe immersed in the coolant for rendering a transistor conductive to in turn operate a relay to signal the presence of coolant. However, this arrangement will not permit an economical intermittent or flasher type signal, which is desirably attention commanding to be readily turned off on the presence of coolant, nor will it desirably permit a transistor to be rendered non-conductive responsive to the presence of coolant for controlling a signal without a relay.

Accordingly, it is a primary object of the present invention to provide an improved probe and an economical flasher signal circuit to indicate the presence and absence of liquid.

It is another object of the present invention to provide a probe which is capable of turning off either a steady signal or a flasher signal operated solely under transistor control to indicate the absence of liquid.

It is another object of the present invention to provide an improved probe and apparatus capable of indicating at least three liquid levels.

The improvements of the present invention are accomplished by providing a coolant sensing probe which is electro-negative or only slightly positive relative its other terminal which is normally the housing through which the coolant circulates. Since the housing of a marine engine is generally of aluminum, the probe preferably is formed of either cadmium or zinc although other metals, such as silver or gold, could be used except for their expense. This type of material permits an economical flasher circuit to be controlled to provide an intermittent signal or the control of a simple transistor circuit to provide a steady-state signal. For sensing respective coolant levels a probe comprising both material of the type described, together with a material having a decided electropositive character relative the housing, is used to control a flasher circuit for indicating at least three coolant levels.

Other objects and features of the present invention will become apparent on examination of the following specification, claims and drawings, wherein:

Figure 1:
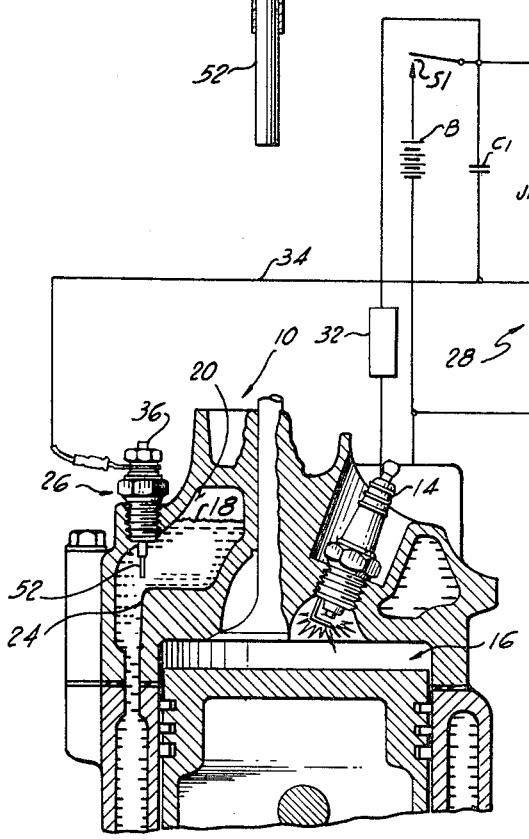
FIG. 1 is an illustrative view of the probe assembly and flasher circuit in conjunction with a relevant portion of a marine engine with which the present invention may be utilized.

In FIG. 1 the upper portion of a marine engine is indicated generally by the reference character 10. The engine includes a spark plug 14 for firing a combustible gas mixture in a firing chamber 16. The walls of chamber 16 are cooled by a coolant 18 circulated by a pump, now shown, through a cooling chamber 20 defined in part by outer and inner aluminum walls 22 and 24, respectively.

A probe assembly 26 is mounted in the outer wall 22 of the chamber 20 for controlling an electrical circuit indicated generally at 28. The circuit 28 includes a type 2N2925 NPN transistor Q1 having a base circuit B1 and a collector circuit connected to a base circuit B2 of a type MPS6535 PNP transistor Q2. Transistor Q1 has an emitter circuit E1 connected to a ground wire 30 through a 39 ohm resistor R1 while the collector circuit of transistor Q2 is connected to wire 30 through a lamp L1. The emitter circuit E2 of transistor Q2 is connected to the positive pole of a 10 to 14 volt battery B through a switch S1 which may also be used to apply a firing potential to plug 14 through conventional coil and related apparatus indicated at box 32.

The base circuit B1 of transistor Q1 is connected at junction J1 through a 1.8 megohm resistor R2 and switch S1 to the positive pole of battery with resistor R2 being shunted by a transient bypass .001 mfd. capacitor C1. The base circuit B1 of transistor Q1 is also connected to the collector circuit of transistor Q2 through an RC circuit comprising a 150K resistor R3 connected to the junction J1 and a .1 mfd. capacitor C2. Junction J1 is also connected to ground wire 30 through a .0001 mfd. transient bypass capacitor C3 and over a conductor 34 to a terminal 36 on probe assembly 26.

Figure 2:
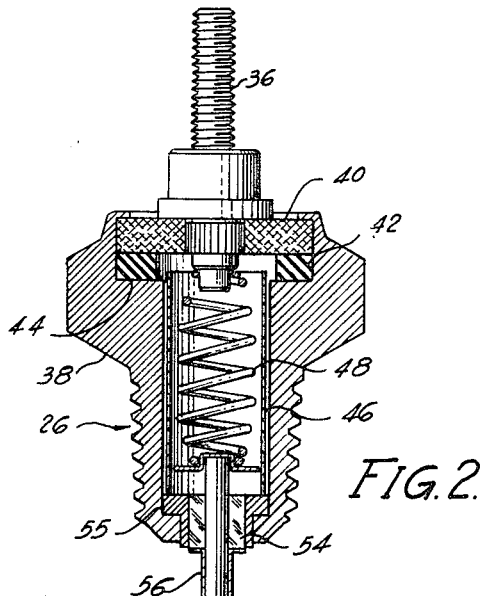
FIG. 2 is a sectional view illustrating the probe assembly.

The probe assembly 26 as seen in FIG. 2 comprises a hollow metal shell 38 having threads at one end for mounting the probe assembly in an appropriate opening in wall 22. One end of terminal 36 is press fit through an insulating member 40 which abuts a gasket 42 bearing on an internal shoulder 44 of the shell and the top end of the shell 38 is rolled over against member 40 to hold it firmly seated against the gasket.

An insulating sleeve 46 is provided in the shell and it encircles a coiled spring 48 which is seated under compression between the extending end of terminal 36 and a cap 50 to which one end of an elongate probe 52 of cadmium or zinc rod is affixed.

The rod 52 is fused in a glass seal 54 and extends beyond the end of shell 38. The seal is held in an annular insulator 55 soldered to the botom end of shell 38 and seated against an internal shoulder of the shell. The rod 52 extends for at least ½" into chamber 20 when the probe assembly 26 is mounted in the wall 22 and is spaced from the nearest other wall such as 24 by a distance of approximately ½". When coolant 18 is present in the chamber 20 a conductive path or circuit is extended from battery and junction J1 over wire 34, terminal 36, spring 48 and cap 50 through the rod 52 and the coolant 18 to the opposite wall 24, which is connected to ground at wire 30 so that the potential at J1 assumes a value dependent on the relative resistance of the coolant and resistor R2 and the nature of the probe material.

A Teflon encapsulation 56 is adherent to the surface of the rod 52 and the encapsulation is provided with a flange abutting the seal 54 to cover the end of the seal exposed to coolant. The encapsulation 56 extends for at least ¼" along the rod 52 from the end of seal 54 and since the coolant does not wet the Teflon surface, no residual moisture on the extending end of rod 52 can establish an electrical path from the rod to the near wall 22 or shell in the event of the coolant level falling below rod 52.

The engine operator on starting the engine 10 closes switch S1 to extend positive potential from battery B through resistor R2 to the base circuit B1 of Q1. The collector circuit of Q2 therefore starts to draw current through the base circuit B2 of transistor Q2. Current therefore flows through the emitter collector circuit of transistor Q2 and a portion of the current swing is fed back through the RC circuit comprising capacitor C2 and resistor R3 to increase the current flow through the base emitter circuit of Q1. This in turn increases the flow through the emitter circuit of Q1. This in turn increases the flow through the emitter collector circuit of transistor Q2 to cause the lamp L1 to light brightly. When transistor Q2 reaches saturation the feedback through the RC circuit to the base circuit B1 of transistor Q1 reverses and the Q1 starts to turn off. This in turn lowers the current flow through the emtter collector circuit of transistor Q2 to substantially extinguish the lamp L1 and drive transistor Q1 further towards cut off to in turn drive Q2 towards cut off.

When transistor Q2 is substantially turned off, the discharge of capacitor C2 through resistor R3 initiates current flow through the base emitter circuit of Q1 to in turn initiate conduction through transistor Q2 and the lamp L1 again lights brightly. In this manner the lamp L1 flashes on either the initial engine start or during absence of coolant in the chamber 20 to signal the operation accordingly. If the lamp L1 does not turn off after the engine starts, as will be explained, or if the lamp starts to flash, as described above, the operator immediately is informed of the absence of coolant.

On the appearance of sufficient coolant 18 in chamber 20, conduction from rod 52 through the coolant 18 occurs. With a cadmium rod and a battery potential of substantially 14 volts, the junction J1 and the base circuit B1 of transistor Q1 falls to approximately ground potential as long as the resistance of the coolant does not exceed 40,000 ohms. With a zinc rod the potential at junction J1 and the base circuit of Q1 falls to a potential of —.22 volt on the establishment of a circuit through the coolant. Thus, the rod material establishes an electronegative potential relative to the aluminum housing for opposing the battery potential sufficiently to effectively maintain transistor Q1 turned off. Lamp L1 therefore remains off and the operator is signalled that coolant has entered chamber 20 if the engine has just been started or that coolant is present in chamber 20.

In the use of a carbon probe or rod, it will be noted that a potential of approximately +.7 is established at junction J1 to bias the base B1 of Q1 in the conductive range despite the appearance of coolant 18 in chamber 20. This potential prevents the circuit 28 from effectively signalling a change in condition because the positive bias at junction J1 simply maintains the lamp L1 in a steady lighted condition.

Figure 3:
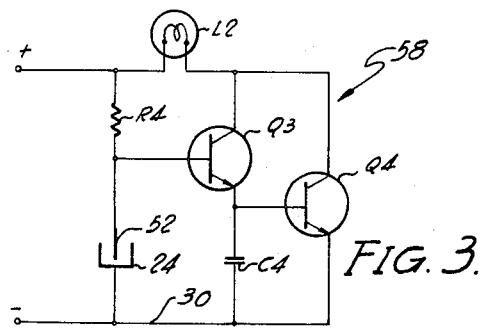
FIG. 3 is a circuit diagram illustrating the use of the probe shown in FIG. 1 in a conventional transistorized signal circuit providing a steady-state signal.

In FIG. 3 another circuit indicated generally by character 58 is provided for use with probe assembly 26. Circuit 58 comprises a pair of cascaded NPN transistors Q3 and Q4, for example, of types 2N2923 and 2N3402, respectively. The probe or rod indicated at 52 is connected to the base circuit of transistor Q3. The wall of the coolant chamber is indicated at 24 for connection to a ground wire such as 30. The base circuit of Q3 is also connected to the positive terminal of battery through a 330K resistor R4 and a switch similar to S1. The emitter circuit of transistor Q3 is connected directly to the base circuit of transistor Q4 and to the wire 30 through a .0047 mfd. bypass capacitor C4. The emitter circuit of transistor Q4 is connected directly to ground and the collector circuits of both transistors Q3 and Q4 are connected to the positive pole of battery through a lamp L1 and the aforementioned switch.

In this circuit with coolant present in chamber 20 at a level sufficient to establish conduction from rod 52 to the wall 24, for example, the potential at the base circuit of transistor Q3 goes toward ground. Transistor Q3 may conduct under these circumstances dependent on the nature of the probe material; however the level of conduction through Q3 is insufficient to turn Q4 on. If, however, when an open circuit is present between the rod 52 and the housing wall, as occurs when the coolant level falls or on starting the engine, the potential at the base circuit of Q3 goes positive to a level supporting full conduction through the transistor. This causes the base circuit of transistor Q4 to swing more positive, thereby establishing full conduction through emitter collector circuit of transistor Q4. This causes the lamp L2 to visibly light and it remains lighted to provide a steady signal indicating absence of coolant. On appearance of coolant the base circuit of transistor Q3 swings negative or towards ground potential thereby reducing the current through Q3 and the bias on the base circuit of Q4 also swings toward ground, thereby reducing the current flow through Q4 and extinguishing the lamp.

Figure 4:
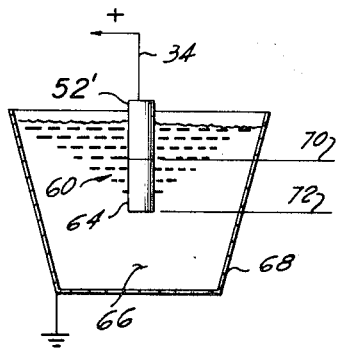
FIG. 4 illustrates a probe construction utilizing two different materials for use with the circuit shown in FIG. 1 to indicate respective coolant levels for each material.

In FIG. 4 a probe 60 is illustrated for use in a probe assembly such as 26. The probe 60 in this case comprises a rod portion 52′ of zinc or cadmium as described for rod 52 with an additional rod portion 64 of carbon fastened to its lower surface. The chamber in which coolant 66 is circulated is schematically illustrated by a vessel 68. The zinc portion 52′ of the rod is connected over a wire such as 34 to junction J1 of a circuit such as 28 through probe assembly such as 26 as previously explained.

With the water or coolant level indicated at 70 high enough to contact the zinc portion of probe 60, current flow through the zinc and coolant maintains the bias level for the base circuit of transistor Q1 at or below the value necessary to maintain transistors Q1 and Q2 turned off so that lamp L1 is extinguished.

When the coolant level falls below the zinc rod portion as indicated at 72 and is engaged with the carbon portion 64 solely of probe 60, the potential at junction J1 rises to a value where transistor Q1 is turned on continuously to maintain transistor Q2 turned on continuously. Lamp L1 is therefore lighted brightly to signal the need for additional coolant.

If the coolant falls below the level of the carbon portion 64 of probe 60, the bias level at the base circuit B1 of transistor Q1 is now free to fluctuate for flashing lamp L1 as previously explained to signal the absence of coolant and the necessity to stop the engine.

What is claimed is:

1. For use in controlling a pair of transistors connected to a source of potential with a signalling device connected to the output of one of said transistors for indicating the coolant level in a cooling chamber defined by a metal wall, the improvement comprising a capacitor, a resistor serially connected with said capacitor between the output of said one transistor and the base circuit of the other transistor to form an RC circuit for operating said signalling device intermittently to indicate the absence of coolant in said cooling chamber, a metal probe material having an electro-negative character relative said metal wall for insertion in said cooling chamber, and means for connecting the base circuit of said other transistor to said probe material whereby a circuit is established through said probe material and coolant to said wall in response to the level of coolant in said chamber reaching said metal probe with the potential between said probe and metal wall serving to bias said other transistor nonconductive irrespective of said RC circuit for maintaining said signalling device unoperated to indicate the presence of coolant in said chamber.

2. For use in controlling a pair of transistors connected to a source of potential with a signalling device connected to a source of potential with a signalling device connected to the output of one of said transistors and an RC circuit connected between the output of said one transistor and the base circuit of the other transistor for operating said signalling device intermittently to indicate the absence of coolant in a cooling chamber defined by a metal wall, the improvement comprising a metal probe material having an electronegative character relative said metal wall for insertion in said cooling chamber, means for connecting the base circuit of said other transistor to said probe material in response to the level of coolant in said chamber reaching said metal probe whereby a circuit is established through said probe material and coolant to said wall with the potential between said probe and metal wall serving to bias said other transistor nonconductive irrespective of said RC circuit for maintaining said signalling device unoperated to indicate the presence of coolant in said chamber, and a second probe material having an electro-positive character relative said wall and located in said chamber at a level different than said electro-negative material and connected to said other transistor through said electro-negative metal probe material whereby another circuit is established through said electro-negative and electro-positive materials and through said coolant to said metal wall in the event said coolant is engaged only with said electro-positive material and metal wall for biasing said other transistor continuously conductive for maintaining said signalling device continuously operated irrespective of said RC circuit.

3. For use in sensing the coolant level in a cooling chamber formed by a metal wall of an engine having a source of potential associated therewith and a signal device to be controlled in accordance with said coolant level, the improvement comprising a pair of transistors each having a base circuit and an emitter collector circuit with the emitter collector circuit of one transistor connected in series with the base circuit of the other transistor and said signal device controlled in accordance with the current level in the collector circuit of said other transistor, a resistor connected between the base circuit of said one transistor and said source of potential for biasing said one transistor conductive, a second resistor, a capacitor serially connected with said second transistor between the base circuit of said one transistor and the collector circuit of said other transitsor to form an RC circuit for rendering said transistors intermittently conductive to vary the current level in the collector circuit of said other transistor accordingly, and a metal probe connected to the base circuit of said one transistor for insertion in said cooling chamber, said probe having an electro-negative character relative said metal wall for causing said transistors to be rendered continuously non-conductive responsive to the level of coolant in said chamber establishing a conductive path between said probe and said metal wall whereby the current level in the collector circuit of said other transistor controls said signal device to signal a corresponding level of said coolant and the failure of said coolant to establish said conductive path permits the current level in the collector circuit of said other transistor to vary in accordance with the intermittent conductivity of said transistors to control said signal device to signal another coolant level.

4. For use in sensing the coolant levels in a cooling chamber formed by a metal wall of an engine having a source of potential associated therewith and a signal device to be controlled in accordance with said coolant levels, the improvement comprising a pair of transistors each having a base circuit and an emitter collector circuit with the emitter collector circuit of one transistor connected in series with the base circuit of the other transistor and said signal device is controlled in accordance with the current level in the collector circuit of said other transistor, a resistor connected between the base circuit of said one transistor and said source of potential for biasing said one transistor conductive, and RC circuit connected between the base circuit of said one transistor and the collector circuit of said other transistor for rendering said transistors intermittently conductive to vary the current level in the collector circuit of said other transistor accordingly, a first probe connected to the base circuit of said one transistor for insertion in said cooling chamber, said probe having an electro-negative character relative said metal wall for causing said transistors to be rendered continuously nonconductive responsive to the presence of coolant in said chamber establishing a conductive path between said probe and said metal wall whereby the current level in the collector circuit of said other transistor controls said signal device accordingly to signal the presence of said coolant, and a second probe connected to said first probe and having an electro-positive character relative said metal wall with said second probe located below the level of said first probe in said chamber for causing said transistors to be rendered continuously conductive responsive to the level of said coolant in said chamber establishing a conductive path between said second probe material and said metal wall whereby the current level in the collector circuit of said other transistor controls said signal device to signal another coolant level and the failure of said coolant to establish a conductive path from each of said probes permits the current level in the collector circuit of said other transsistor to vary in accordance with the intermittent conductivity of said transistors to control said signal device to signal a third coolant level.

References Cited

UNITED STATES PATENTS

| | | |
|---|---|---|
| 2,233,297 | 2/1941 | Polin et al. |
| 3,129,413 | 4/1964 | Watson. |
| 3,139,556 | 6/1964 | Grontkowski ____ 340—331 XR |
| 3,145,375 | 8/1964 | Webb _____ 340—331 XR |
| 3,257,643 | 6/1966 | Jensen. |
| 3,259,841 | 7/1966 | Proctor et al. |
| 3,327,214 | 6/1967 | Allen et al. |
| 3,368,404 | 2/1968 | King _____ 73—304 |

(Other references on following page)

| UNITED STATES PATENTS | | | |
|---|---|---|---|
| 3,391,302 | 7/1968 | Weingarden | 315—82 XR |
| 1,910,021 | 5/1933 | Legg. | |
| 2,229,036 | 1/1941 | Bird et al. | |
| 2,593,252 | 4/1952 | Booth | 73—304 XR |
| 3,246,235 | 4/1966 | Allsopp | 324—30 XR |
| 3,312,936 | 4/1967 | Huntzinger | 340—59 |

FOREIGN PATENTS 1,366,071  6/1964  France.

ALVIN H. WARING, Primary Examiner

D. MYER, Assistant Examiner

U.S. Cl. X.R.

340—59